United States Patent
Kemper et al.

(10) Patent No.: US 9,231,503 B2
(45) Date of Patent: Jan. 5, 2016

(54) METHODS AND APPARATUSES FOR SELECTIVELY CONTROLLING MOTOR POWER BOARDS

(71) Applicant: Google Inc., Mountain View, CA (US)

(72) Inventors: Kevin Kemper, San Francisco, CA (US); Lee Magnusson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/288,662

(22) Filed: May 28, 2014

(65) Prior Publication Data
US 2015/0349676 A1    Dec. 3, 2015

(51) Int. Cl.
  *H02P 1/00* (2006.01)
  *H02P 6/00* (2006.01)
(52) U.S. Cl.
  CPC ...................................... *H02P 6/002* (2013.01)
(58) Field of Classification Search
  CPC ........................................................ B26B 19/00
  USPC .................... 318/504, 494, 34, 558
  See application file for complete search history.

(56) References Cited

U.S. PATENT DOCUMENTS

| | | | |
|---|---|---|---|
| 5,770,902 A * | 6/1998 | Batten et al. .................... | 310/71 |
| 7,068,515 B2 | 6/2006 | Harris et al. | |
| 7,262,528 B2 | 8/2007 | Amagasa | |
| 7,671,490 B2 * | 3/2010 | Hartung .................. | H02J 1/102 307/113 |
| 8,084,903 B2 | 12/2011 | Goetze et al. | |
| 8,804,313 B2 * | 8/2014 | Peterson et al. ............. | 361/622 |
| 9,000,634 B2 * | 4/2015 | Tanaka et al. .................... | 310/64 |
| 2013/0342968 A1 | 12/2013 | Peterson et al. | |

* cited by examiner

*Primary Examiner* — David S Luo
(74) *Attorney, Agent, or Firm* — McDonnell, Boehnen, Hulbert & Berghoff LLP (57) ABSTRACT

Methods and systems for building arbitrary motor controllers are described. An example motor controller may include multiple motor power boards connected in a stacked configuration and coupled in parallel. Each motor power board may include one or more power transistors and one or more gate drivers having an input terminal coupled to a control signal connector and an output terminal coupled to a gate terminal of the one or more power transistors. The example motor controller may also include a power bus connector coupled, in parallel, to a respective output terminal of each of the multiple motor power boards. Further, the example motor controller may include a control system coupled to the control signal connector and configured to selectively enable a set that includes one or more of the multiple motor power boards based on an output power requirement.

20 Claims, 7 Drawing Sheets

METHODS AND APPARATUSES FOR SELECTIVELY CONTROLLING MOTOR POWER BOARDS

BACKGROUND

Unless otherwise indicated herein, the materials described in this section are not prior art to the claims in this application and are not admitted to be prior art by inclusion in this section.

Motor controllers are devices or groups of devices that function to control the operation of an electric motor. A motor controller connected to a motor may start or stop the motor, select forward or reverse on the motor, select or regulate the speed of the motor, and regulate or limit the torque of the motor, among other functions. A motor controller may include a switch or set of switches to connect a motor to a power supply. The switch(es) may have several different positions or combinations to select different electrical connections. When selected, the different electrical connections may cause the motor to operate in various ways, such to start or stop, or to forward or reverse, as noted above. Further, rapid switching of the electrical connections, such as by a pulse width modulated signal, may vary the speed of the motor.

Some motor controllers use metal oxide semiconductor field-effect transistors (MOSFETs) as switches to control operations of the motor. Motor controllers may use a particular type of MOSFET known as a power MOSFET, some of which are designed to handle the significant power levels that may be associated with motor operation. To increase the power handling capability of a motor controller, the motor controller may include multiple power MOSFETs that are connected in parallel. Then, a power amplifier known as a gate driver may drive the parallel MOSFETs.

SUMMARY

In one example, an apparatus is provided that includes multiple motor power boards connected in a stacked configuration, wherein each motor power board comprises one or more power transistors and one or more gate drivers having an input terminal coupled, in parallel, to a control signal connector and an output terminal coupled, in parallel, to a gate terminal of the one or more power transistors. The apparatus also includes a power bus connector coupled, in parallel, to a respective output terminal of each of the multiple motor power boards. The apparatus further includes a control system coupled to the control signal connector and configured to selectively enable a set that includes one or more of the multiple motor power boards based on an output power requirement.

In another example, a method for providing building an arbitrary motor controller is provided. The method includes stacking multiple motor power boards that each have one or more power MOSFETs and one or more gate drivers having an input terminal coupled, in parallel, to a control signal connector and an output terminal coupled, in parallel, to a gate terminal of the one or more power MOSFETs. The method also includes physically coupling a control system to the multiple motor power boards, wherein the control system is configured to enable, over the control signal connector, the multiple motor power boards.

In still another example, another apparatus is provided that comprises multiple motor power boards connected in a stacked configuration, wherein each motor power board comprises one or more power MOSFETs and one or more gate drivers having an input terminal coupled, in parallel, to a control signal connector and an output terminal coupled, in parallel, to a gate terminal of the one or more power MOSFETs. The apparatus also comprises a control system coupled to the control signal connector and configured to selectively provide, over the control signal connector, a drive signal to a set of the multiple motor power boards based on an output power requirement.

In yet another example, a system is provided that includes a means for stacking multiple motor power boards that each have one or more power MOSFETs and one or more gate drivers having an input terminal coupled, in parallel, to a control signal connector and an output terminal coupled, in parallel, to a gate terminal of the one or more power MOSFETs. The system further includes a means for physically coupling a control system to the multiple motor power boards, wherein the control system is configured to enable, over the control signal connector, the multiple motor power boards.

These as well as other aspects, advantages, and alternatives, will become apparent to those of ordinary skill in the art by reading the following detailed description, with reference where appropriate to the accompanying figures.

DETAILED DESCRIPTION

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

Example implementations provide for arbitrary motor controllers which may be built or re-built to satisfy different operating requirements, such as power output. An example motor controller may include multiple motor power boards in a stacked configuration. The multiple motor power boards may parallelize certain functions of the motor controller. In particular, in the stacked configuration, the motor power boards may receive parallel input and provide parallel output, which may cause the multiple motor boards to function in parallel. For instance, each motor power board may switch to a motor a portion of the total power output to the motor. Accordingly, scaling the number of motor power boards in the stacked configuration may increase or decrease the power output capability of the motor controller.

Each motor power board may include one or more components that facilitate controlling the operation of an electric motor. For example, the motor power boards may include, respectively, one or more power transistors (e.g. power MOSFETSs) in an arrangement that facilitates switching a power source to a motor. For instance, on each motor power board, the one or more power transistors may form an H-bridge circuit, which may facilitate motor operations such as forward and reverse, or motor braking Other types of switches and arrangements thereof are possible as well. For instance, the motor power boards may include bi-polar junction transistors or relays, among other examples.

Each motor power board may further include one or more gate drivers that drive the gate terminals of one or more power transistors. Gate drivers may function as power amplifiers to boost drive signals received at an input terminal of the gate driver. To facilitate driving the gate terminal, each gate driver may have its input terminal coupled to a control signal connector and an output terminal coupled to a gate terminal of the one or more power transistors. As noted above, the motor power boards may receive parallel input. In one example, the input terminal of each gate driver of a motor power board may be connected in parallel with an input terminal gate driver of the other motor power boards, such that a given input terminal of each motor power board may receive the same drive signal. For instance, an example motor controller may include a first motor power board and a second motor power board that each have a first gate driver and a second gate driver. The input terminal of the first gate driver of the first motor power board may be connected in parallel with the input terminal of the first gate driver of the second motor power board. Similarly, the input terminal of the second gate driver of the first motor power board may be connected in parallel with the input terminal of the second gate driver of the second motor power board.

An example motor controller may further include a control system that is physically coupled to the multiple motor power boards. The control system may couple to the input terminals of the gate drivers over a control signal connector such that the control system may provide a drive signal to the gate drivers. Signals provided from the control system may selectively enable a set of one or more of the motor power boards based on various operating requirements, such as desired power output. The control system may also receive data from one or more sensors and then adjust the set of enabled motor power boards to include additional or fewer motor power boards based on the received data. The control system may also perform other functions, such as determining the desired drive signal based at least in part on one or more inputs to the control system.

The motor power boards may be alike, such as may result from a manufacturing process that produces like output. Such similarity among the multiple motor power boards may reduce design time and manufacturing costs, among other possible benefits. Further, because of the similarity among the multiple motor power boards, the multiple motor power boards may, in the stacked configuration, form a stack having substantially consistent length and width. The height of the stack may vary as motor power boards are added to or removed from the stack. A motor power controller having motor power boards in a stacked configuration may, in some circumstances, have a higher power handling capability in a smaller volume (i.e. a higher density of power handling capability) compared with some other configurations of motor power controllers.

Figure 1:
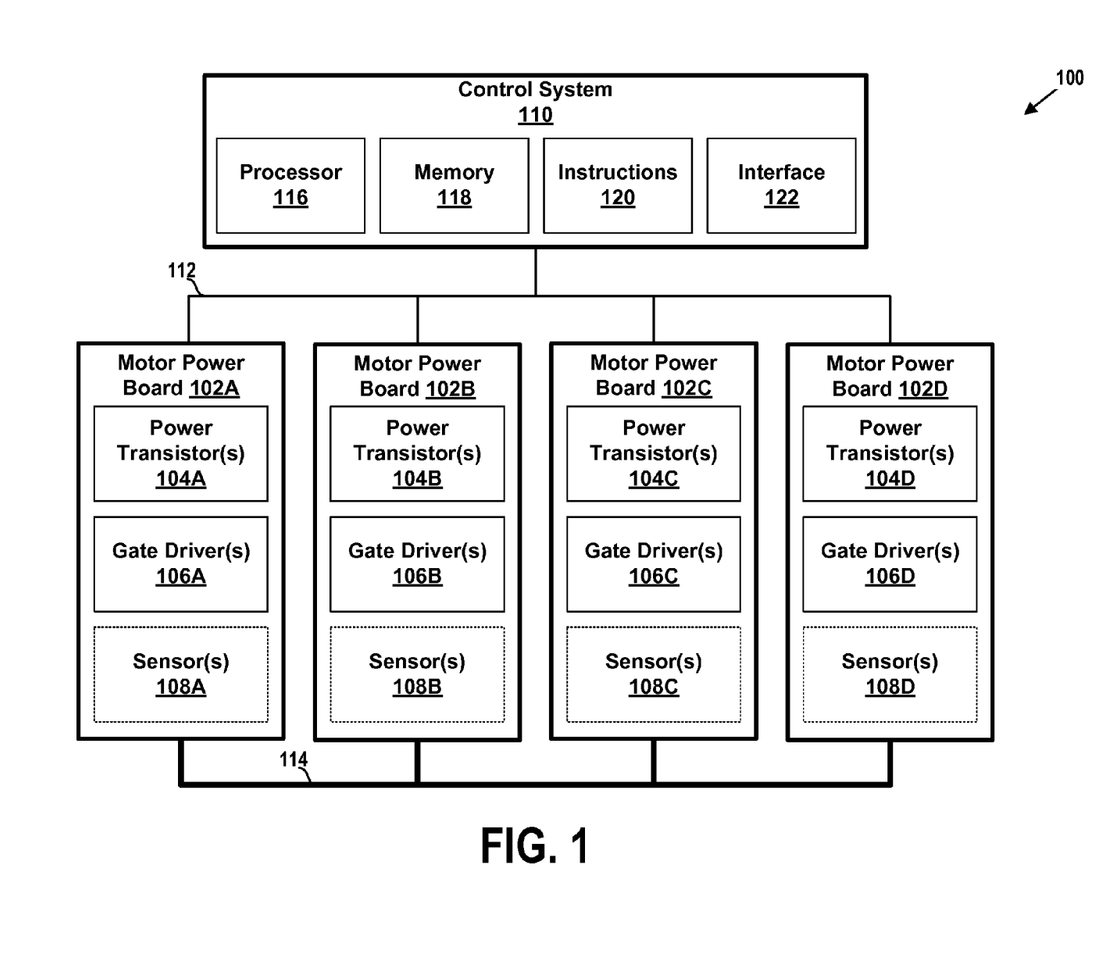
FIG. 1 is a block diagram illustrating an example motor controller.

Referring now to the figures, FIG. 1 is a block diagram illustrating an example motor controller 100. In operation, the motor controller 100 may function to control performance of an electric motor. The motor controller 100 includes multiple motor power boards 102A, 102B, 102C, and 102D. While four motor power boards are shown by way of example, the motor controller 100 may include any number of motor power boards. The motor controller 100 may also include a control system 110 connected to the multiple motor boards by a control signal connector 112.

The multiple motor power boards 102A, 102B, 102C, and 102D may each include various components on a circuit board. The components may form a circuit that facilitates switching a power supply to a motor. To facilitate switching, the components may include power transistor(s) 104A, 104B, 104C, and 104D, respectively. In particular, an example circuit may include a power transistor that switches power supply terminals to motor output terminals. When the power transistor is "on", current may flow through the transistor from the power supply terminals to the motor output terminals, which may cause the motor to start running Conversely, when the power transistor is "off", current is unable to flow from the power supply terminal to the motor output terminals, which may cause the motor to stop running Other example circuits may have multiple power transistors which may facilitate operating the motor in any of a variety of different ways.

Motor power boards 102A, 102B, 102C, and 102D may support (e.g., be rated at) certain operating parameters. The supported operating parameters may be based on a variety of factors, such as the particular components included on the motor power board or the particular circuit design of the motor power board used to facilitate the switching function. In one example, each motor power board may support operating at a certain output power, such as 1000 watts (W) continuous. The continuous output rating may depend on certain operating conditions, such as environmental temperature. Further, each motor power board may support operating at a higher power output for short periods of time (e.g. a peak output), such as 1550 W peak. However, prolonged operation at peak power output level may cause heating which may damage components of the motor power boards.

As noted above, the multiple motor power boards may be stackable with one another. Stacking the motor power boards may result in a stacked configuration. Stacking the motor power boards may involve connecting one or more removable connectors to provide physical connection and/or a communicative coupling between two or more motor power boards. Many types of connectors may be used to connect the motor power boards in the stacked configuration, such as screw-type or snap-type, among many others. The particular nature of the connectors is not important, but the connectors may be removable to facilitate scaling the number of motor power boards in the stacked configuration of the motor controller.

Within examples, each motor power board may include similar connectors. Similar connectors may facilitate connecting an arbitrary number of motor power boards into the stacked configuration. For instance, one or more particular connectors on the bottom of motor power board 102A may facilitate connecting the motor power board 102A to corresponding connectors on the top of motor power board 102B. Further, one or more particular connectors on the bottom of motor power board 102B may facilitate connecting the motor power board 102B to corresponding connectors on the top of motor power board 102C. This pattern may repeat as the number of motor power boards in the stacked configuration is scaled up and down.

While connectors on the top and bottom of each motor power board have been described by way of example, the multiple motor power boards may include connectors in any suitable location, such as along the side of the multiple motor power boards. In some examples, the connectors may screw-type connectors. For instance, bolts may extend through holes in each motor power board. Then nuts may fasten the multiple motor power boards to one another.

As noted above, the multiple motor power boards 102A, 102B, 102C, and 102D may be alike, such as may result from a manufacturing process that produces like output. In some examples, the multiple motor power boards 102A, 102B, 102C, and 102D may be identical, except for insubstantial differences that may result from imperfections in the manufacturing process used to produce the motor power boards. Identical motor power boards may facilitate the arrangement of the motor power boards into a stacked configuration.

In other examples, motor power boards 102A, 102B, 102C, and 102D may be produced to one or more specifications. For example, one specification may suggest producing motor power boards having a certain length and width. This specification may facilitate arranging the motor power boards into a stacked configuration having substantially consistent length and width. Another specification may suggest locating certain components, such as the terminals of bus 114, in particular locations. For instance, a specification may locate power supply terminals in particular positions on the motor power boards. This specification may facilitate interconnecting the motor power boards when the motor power boards are stacked. A specification may also suggest orientating components of the motor power boards in certain ways. For instance, according to a specification, capacitors may extend along a particular side of the motor power boards. Yet another specification may suggest that each motor power board support certain operating parameters. Other specifications are possible as well.

As noted above, motor power boards 102A, 102B, 102C, and 102D may each include one or more power transistor(s) 104A, 104B, 104C, and 104D, respectively. The power transistors may facilitate switching a power supply to a motor. Although power transistors are shown by way of example, motor power boards 102A, 102B, 102C, and 102D may include different types of switches other than power transistors, such as relays. In some examples, the motor power boards may use a particular type of power transistors, such as power MOSFETS or bi-polar junction transistors (e.g. insulated-gate bipolar transistors). Certain types of switches may be suitable for certain applications. For instance, relatively high frequency switching may suggest using power MOSFETs as switches.

As noted above, motor power boards 102A, 102B, 102C, and 102D may use power MOSFETs. Power MOSFETs are a type of MOSFET designed to handle significant power levels. Power MOSFETs may include an isolated gate. An isolated gate in a power MOSFET may form a capacitor known as a gate capacitor, which is charged and discharged when the MOSFET is switched on or off. In operation, a power MOSFET may switch "on" when its gate capacitor is charged above a threshold voltage and switch "off" when its gate capacitor is discharged below a threshold voltage.

Charging and discharging the gate capacitor takes a non-zero amount of time, during which the transistor may transiently support both a high voltage and conduct a high current across its source and drain terminals. Accordingly, power is dissipated in the transistor during this transient switching period, which generates heat. During operation, power transistors 104A, 104B, 104C, and 104D may switch rapidly to vary the speed (and power, as power is proportional to angular velocity) of the motor. Higher frequency switching (i.e. shortening the switching time) reduces power loss and heat generation. Further, the switching time of a transistor is inversely proportional to the amount of current applied to charge the gate. Therefore, some applications may use significant current to drive the gate (e.g. on the order of hundreds of milliamperes to several amperes) in order to reduce the switching time. However, while higher current may reduce the switching time, the switching frequency still is limited by the non-zero amount of time taken to charge the gate capacitor.

Motor power boards 102A, 102B, 102C, and 102D may also include one or more gate drivers 106A, 106B, 106C, and 106D, respectively. Gate drivers 106A, 106B, 106C, and 106D may include power amplifiers that accept a relatively low-current input and produce a high-current output. Gate drivers 106A, 106B, 106C, and 106D may include an input terminal that is coupled to a control system, such as control system 110. The high-current output gate drivers 106A, 106B, 106C, and 106D may drive the gates of the one or more power transistor(s) 104A, 104B, 104C, and 104D, respectively. Each gate driver may be implemented using an integrated circuit, one or more discrete transistors, or a transformer, among other examples. The high-current output of the gate drivers 106A, 106B, 106C, and 106D may shorten the switching time of the one or more power transistor(s) 104A, 104B, 104C, and 104D, which may in turn reduce the current through each power transistor during switching.

To further reduce the current through each power transistor (and accordingly the power dissipated during switching), the motor power board 100 may include power transistors in parallel. Parallel transistors may support higher output power requirements since each power transistor receives a portion of the total current switched by the motor controller. However, the power dissipated in charging the gate capacitor is multiplied by the number of parallel transistors, so adding transistors in parallel increases the total power drawn by the motor controller. In some cases, supporting a high output power requirement using parallel transistors may justify the increased power draw. On the other hand, the power dissipated in charging the gate capacitors of the parallel transistors is independent of the load. Therefore, when the motor is under a relatively lower load (and fewer transistors would be sufficient to meet the output power requirement), the parallel transistors draw the same amount of power to charge their gate capacitors as in cases when the motor is under a higher load. Driving the gates of multiple power transistors in parallel may also require a gate driver having a higher power output.

Alternatively, to support higher power output requirements, the motor controller 100 may include a variable number of motor power boards. This may also allow the motor controller to variably support lower output power requirements as well. For instance, the motor controller 100 may control a motor in a first application having an output power requirement of 1500 W and a second application having an output power requirement of 3500 W. As noted above, motor power boards 102A, 102B, 102C, and 102D may be rated at 1000 W for continuous output, for example. To support application A, motor controller 100 may include motor power board 102A and motor power board 102B (having a combined power rating of 2000 W). Then, to support application B, motor power boards 102C and 102D may be added to the motor controller 100 such that the motor controller 100 includes motor power boards 102A, 102B, 102C, and 102D (having a combined power rating of 4000 W). Accordingly, though motor controller 100 is shown as including four motor power boards by way of example, motor controller 100 may include any number of motor power boards.

In some examples, motor power boards 102A, 102B, 102C, and 102D may additionally include one more sensors 108A, 108B, 108C, and 108D, respectively. In some examples, each motor power board may include one or more temperature sensors. The temperature sensors may be arranged on the motor power board to measure the temperatures of one or more components, such as the power transistor(s). Measuring such temperatures may generate data indicating the temperature of the components. The sensors may send such generated data to a control system, such as control system 110. Alternatively, the sensors may generate an analog signal that is sent to a control system for digitization (e.g. by an analog-to-digital converter). In some cases, the control system may adjust the operation of the motor control system based on the generated data. The temperature sensor may be a thermocouple, a thermistor, or a resistance thermometer, for example.

Within examples, the one more sensors on each motor power board may include one or more power sensors. The power sensors may be arranged to sense the power output of the motor power board. In some cases, the power sensors may directly sense power output of the motor power board. In other cases, the sensors may sense current or voltage and power output may be derived from such measurements. The power sensor may be any of a variety of different types of sensors, such as an IC sensor or a transformer. In some cases, the data may be sent to the control system. For instance, a bus, such as inter-integrated circuit ((I2C) or serial peripheral interface (SPI), may carry the data to the control system.

As noted above, motor controller 100 may include a power sensor on each motor power board. Some motor power controllers (such as those having a single power board) may have a power sensor to measure the total power output of the motor power controller. However, by sensing the power output of each motor power board, rather than the total power output of the motor power controller, the motor power boards may include power sensors having a relatively lower power level sensing capability. Such power sensors may be relatively less expensive than a power sensor that has the capability to sense the total power output of the motor power controller 100. During operation, each power sensor may generate data indicating the power output and the sensor may send such data to a control system, such as control system 110. Then, the control system may adjust the operation of the motor controller based on the generated data. In some cases, the control system may receive data periodically, and adjust the operation periodically in turn.

The control system 110 may be any entity or controller arranged to carry out the control system functions described herein. The control system 110 may include at least one processor 116 (which could include at least one microprocessor) that executes instructions 120 stored in a non-transitory medium such as memory 118. The control system 110 may also represent a plurality of computing devices that may serve to control individual components or subsystems of the motor controller 100 in a distributed fashion.

In some implementations, memory 118 may contain instructions 120 (e.g., program logic) executable by the processor 116 to execute various functions of motor controller 100. Such functions may include enabling one or more of the multiple motor power boards. Memory 118 may contain additional instructions as well, including instructions to transmit data to, receive data from, interact with, and/or control one or more of the motor power boards 120A, 102B, 102C, or 102D.

In some cases, the control system 110 may selectively enable one or more of the multiple motor power boards. The control system 110 may select which of multiple motor power boards to enable based on an output power requirement. For instance, the control system 110 may enable one or more of motor power boards 102A, 102B, 102C, or 102D. In some cases, the output power requirement may be predetermined. In other cases, the control system 110 may receive the output power requirement over interface 122 or the control system 110 may determine the output power requirement.

Instructions 120 may be further executable by the processor 116 to receive sensor data. In some examples, the control system 110 may receive sensor data over interface 122. As noted above, each motor power board may include one or more power sensors. The control system 110 may then receive data indicating power draw from one or more of the power sensors. The control system 110 may then determine the output power requirement based on the data indicating the power draw. In some cases, the control system 110 may selectively enable one or more of the motor power boards based on the output power requirement.

The control system 110 may receive data from one or more temperature sensors. The data may indicate one or more temperatures, such as the temperatures of the power transistors. In some cases, based on the received data indicating temperature, the control system 110 may determine that one or more of the received temperatures is over a predetermined threshold temperature. The threshold temperature may indicate a rated operating temperature of the motor power board (or a component thereof, such as the power transistors). The control system 110 may then enable one or more additional power boards, such as by providing, over the control signal connector 112, a drive signal to one or more additional motor power boards. Enabling one or more additional power boards may reduce the current through each enabled motor power board, which may in turn reduce the temperature of the motor power board.

As noted above, the control system 110 may include an interface 122. Interface 122 may include one or more outputs that may provide drive signals. For instance, interface 122 may include one or more outputs configured to provide a pulse-width modulated (PWM) signal to drive the motor power boards. Pulse-width modulation is a modulation technique that alters the width of periodic pulses (e.g. a square wave) based on the modulator signal information.

In some cases, interface 122 may receive input that indicates different motor operations. For instance, the received input may indicate forward motor operation at half-speed. The control system 110 may receive this input and generate a drive signal that causes the indicated motor operation. Interface 122 may also receive data from the one or more sensors 108A, 108B, 108C, and 108D. As noted above, PWM signals alter the width of periodic pulses based on modulator signal information. The proportion of "on" time to "off" time during one pulse is known as the duty cycle of the PWM signal. For example, control system 110 may generate a PWM signal having a 50% duty cycle (i.e. 50% of the pulse is "on" and 50% of the pulse is off) to cause forward motor operation at half-speed.

Also shown in FIG. 1, a control signal connector 112 communicatively couples the multiple motor power boards 102A, 102B, 102C, and 102D to a control system 110. In operation, control system 110 may enable one or more of the multiple motor power boards 102A, 102B, 102C, and 102D over the control signal connector 112. As noted above, the control system 110 may selectively enable a set of motor power boards that includes one or more of the multiple motor power boards.

Control system 110 may provide one or more drive signals over the control signal connector 112 to motor power boards 102A, 102B, 102C, and 102D. The drive signal may take a variety of forms, such as a pulse-width modulated (PWM) signal. The control signal connector 112 may include multiple signal paths to selectively drive the one or more power transistors on each motor power board individually. Alternatively, a signal path may selectively "turn on" multiple power transistors. For instance, two or more power transistors may receive the same drive signal and "turn on" at the same time.

The motor controller 100 may operate the motor power boards in parallel using the control signal connector 112. In particular, the control signal connector 112 may connect multiple motor power boards 102A, 102B, 102C, and 102D in parallel. For instance, each motor power board may have a first power transistor and a second power transistor. The control signal connector 112 may connect the gate terminals of the first power transistors in parallel with one another and the gate terminals of the second power transistors in parallel with one another. Then, control system 110 may provide a first drive signal and a second drive signal over control signal connector 112 to all of the gate terminals of the first transistors and all of the gate terminals of the second transistors, respectively. As noted above, a gate driver may be coupled between the control system 110 and each power transistor to amplify the drive signal. Therefore, in some implementations, the control system connector 112 may couple the input terminals of gate drivers in parallel. The output of each gate driver may then connect to the gate terminal of one or more power transistors.

Motor controller 100 also includes a bus 114 that couples, in parallel, terminals of each of the motor power boards 102A, 102B, 102C, and 102D. For instance, the bus 114 may connect power supply terminals of each motor power board in parallel. Then, a power supply may supply power to the multiple motor power boards using one set of connections (e.g. positive and negative). Further, the bus 114 may connect motor output terminals of the multiple motor power boards in parallel. Then output of each motor power board may connect to a motor using one set of connections.

Figure 2:
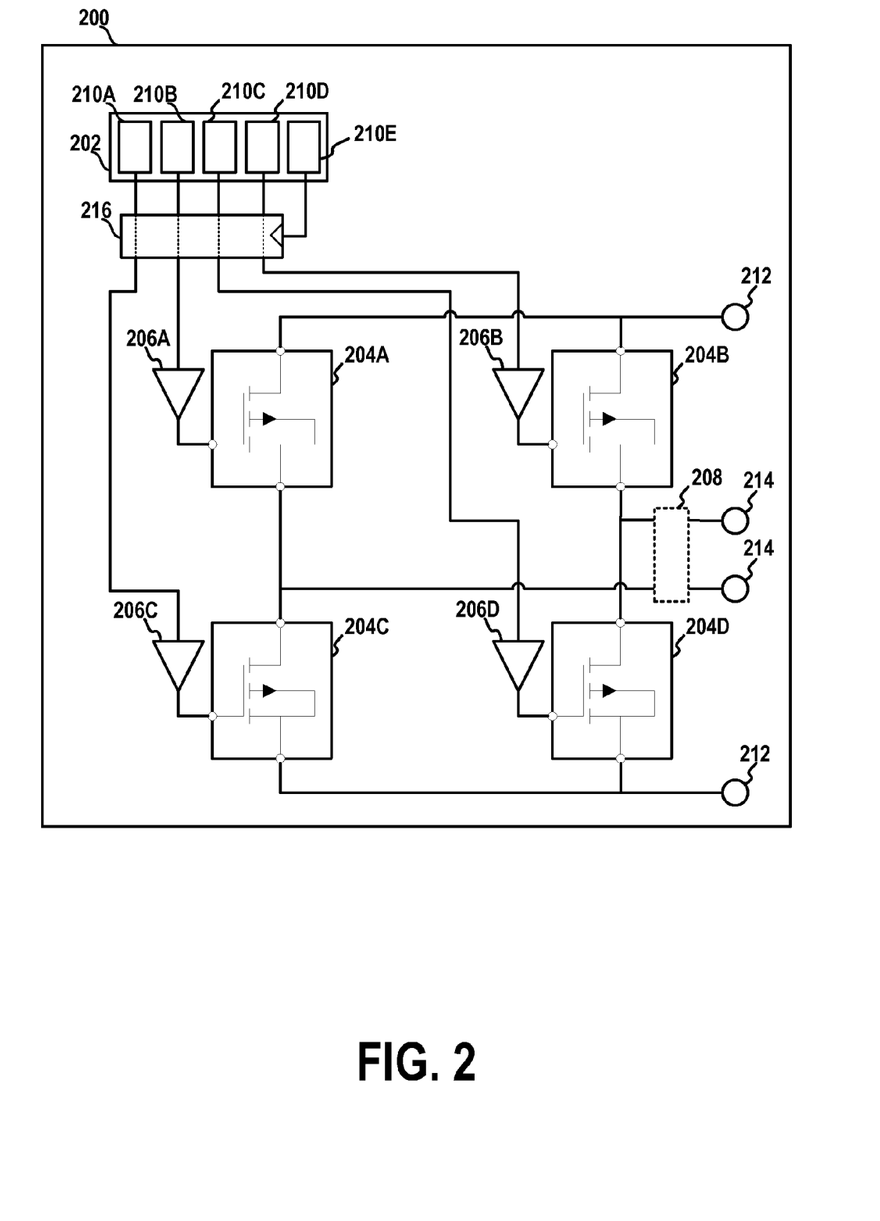
FIG. 2 is a simplified circuit diagram illustrating components of an example motor power board.

FIG. 2 is a simplified circuit diagram illustrating an example circuit 200 which may be implemented on a motor power board, such as motor power board 102A, 102B, 102C, and/or 102D. In operation, the example circuit 200 may switch current from a power supply inputs to motor outputs. One or more drive signals provided to the circuit 200 may cause the switching. For instance, a control system may provide a PWM drive signal to the circuit 200.

Circuit 200 includes MOSFETS 204A, 204B, 204C, and 204D in an H-bridge configuration. The H-bridge configuration includes four switches (MOSFETS 204A, 204B, 204C, and 204D) that allow eight different combinations of switch positions. Each switch position may cause a motor connected to the motor output terminals 214 to operate in a certain way, such as to forward or reverse, to brake, or to stop (i.e. "free run"), when power is provide to power supply terminals 212.

The circuit 200 may also include terminals that provide input to and output from the H-bridge configuration. Power supply terminals 212 may provide input to the H-bridge from a power supply. Further, the power supply terminals 212 may connect in parallel with power supply terminals of other motor power boards. The H-bridge may output to motor output terminals 214. The motor output terminals 214 may connect in parallel with motor output terminals of other motor power boards. A motor may be connected to the parallel output terminals.

The circuit 200 may also include a control signal connector 202. One or more drive signals provided on control signal connector 202 may change the switch positions of MOSFETS 204A, 204B, 204C, and 204D (i.e. open or close the switch). Control signal connector 202 may have a terminal for each MOSFET, such that each MOSFET may be driven independently of the other MOSFETs in the circuit. Terminals 210A, 210B, 210C, and 210D are connected to MOSFETS 204A, 204B, 204C, and 204D, respectively The circuit 200 also includes gate drivers 206A, 206B, 206C, and 206D. Terminals 210A, 210B, 210C, and 210D may provide drive signals as input to gate drivers 206A, 206B, 206C, and 206D. Gate drivers 206A, 206B, 206C, and 206D may in turn output amplified drive signals to MOSFETS 204A, 204B, 204C, and 204D, respectively. Such amplified drive signals may shorten the switching time of MOSFETS 204A, 204B, 204C, and 204D. By way of example, the output of each gate driver is shown connected to the gate terminal of one MOSFET. However, the output of each gate driver may connect to more than MOSFET in parallel. Then, in operation, the MOSFETS having gate terminals connected in parallel may switch in parallel.

When circuit 200 is implemented on a motor power board that is in a stacked configuration with other motor power boards, terminals 210A, 210B, 210C, and 210D may each connect in parallel to a like terminal of one or more of the other motor power boards. For instance, motor power boards 102A, 102B, 102C, and 102D may each include circuit 200 and be connected in a stacked configuration with one another. Then, MOSFETS 204A, 204B, 204C, and 204D on each motor power board may operate in parallel. For example, drive signals provided to terminals 210A and 210D from a control system may cause MOSFETS 206A and 206D on each motor power board to "turn on."

As further shown in FIG. 2, circuit 200 may include a power sensor 208. Power sensor 208 may sense the power drawn at the motor output terminals 214 and generate data indicating the power drawn. As noted above, power sensor 208 may be any type of power sensor. For instance, the power sensor may be an IC Hall Effect sensor that generates data indicating power, voltage, and/or current. The generated data may be sent to a control system, such as control system 110.

Also as shown in FIG. 2, circuit 200 may include one or more switches 216 to enable or disable drive signals provided over control signal connector 202 to power transistors 206A, 206B, 206C, and/or 206D. A control system may control the one or more switches 216. For instance, a control system (e.g. control system 110) may provide a signal on terminal 210E of control signal connector 202 to selectively enable the drive signals to the gate terminals of power transistors 206A, 206B, 206C, and/or 206D. When the drive signals are enabled, the motor power board is "on" and drive signals (e.g. PWM) signals provided on terminals 210A, 210B, 210C, and 210D cause the power transistors to turn "on" and "off" to switch power supply current to motor output. But, when the drive signals are disabled, the motor power board is "off" and the drive signals are not connected to the gates so the power transistors do not switch. When multiple motor power boards are in a stacked configuration, the control system can selectively enable one or more of the multiple motor power boards using one or more switches 216.

Figure 3A:
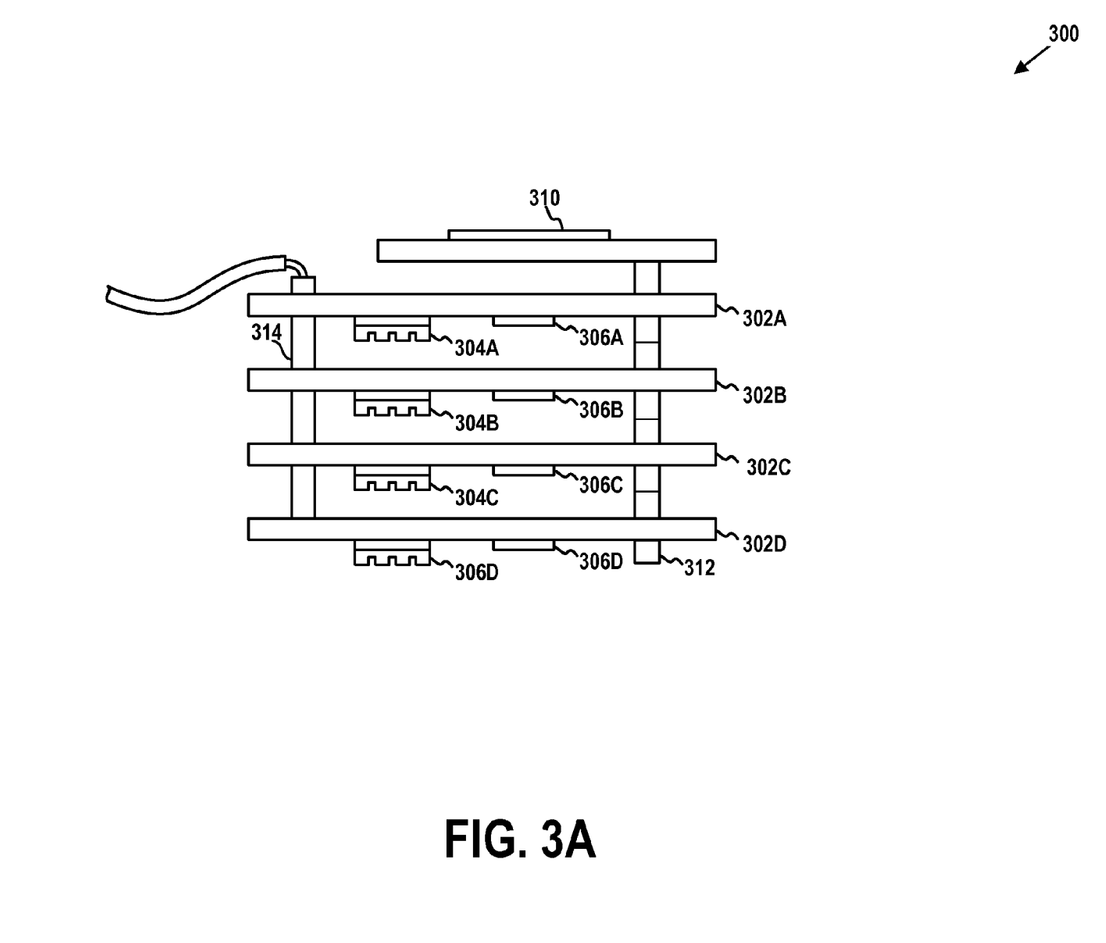
FIG. 3A is a side-view of an example motor controller in a stacked configuration.

As noted above, multiple motor power boards may be connected in a stacked configuration. FIG. 3A is a side view illustrating example motor power controller 300. Motor controller 300 includes motor power boards 302A, 302B, 302C, and 302D in a stacked configuration.

Motor power boards 302A, 302B, 302C, and 302D each include various components for switching power supply to motor output. Such components may be similar to components described in connection with motor power boards 102A, 102B, 102C, and 102D in FIG. 1. For instance, as shown in FIG. 3, motor power boards 302A, 302B, 302C, and 302D include power transistors 304A, 304B, 306C, and 306D, respectively. Motor power boards 302A, 302B, 302C, and 302D may also include gate drivers 306A, 306B, 306C, and 306D, respectively. Each gate driver may include an input terminal that is connected to a control signal connector 312. The control signal connector 312 may connect input terminals of gate drivers 306A, 306B, 306C, and 306D in parallel. Motor power boards 302A, 302B, 302C, and 302D may further include one or more sensors 308A, 308B, 308C, and 308D (not shown). The one or more sensors may include a power sensor and/or a temperature sensor, among other examples.

Motor controller 300 also includes control system 310. Control system 310 may include one or more components that are mounted on a circuit board, as shown. The components may include a processor, a memory, and an interface, among other possible components. Control system 310 may provide a drive signal on control signal connector 312 that is received by each gate driver. Gate drivers 306A, 306B, 306C, and 306D may amplify the drive signals and output the drive signals to an output terminal. The output terminals of gate drivers 306A, 306B, 306C, and 306D may couple to a gate terminal of power transistor 304A, 304B, 306C, and 306D, respectively.

Motor controller 300 further includes a power bus 314. Power bus 314 may connect power supply terminals and motor output terminals of each motor power board in parallel. In operation, one or more of motor power boards 302A, 302B, 302C, and 302D may operate in parallel to switch current supplied at the power supply terminals of the power bus 314 to a motor coupled to the motor output terminals of the power bus 314.

In the stacked configuration, one or more connectors may removably connect the multiple motor boards to one another. Such connectors may allow the addition to or removal of motor power boards from the stacked configuration. Many different types of connectors may be used to removable connect the multiple motor boards. For example, the connectors may be screw-type connectors, such as nuts and bolts. Other types of removably connectable connectors are possible as well. The connectors may provide rigidity to the motor controller to maintain the stacked configuration. In some cases, the connectors may extend through openings in the motor power boards. For instance, a bolt may extend through one or more of the motor power boards. Spacers may set the motor power boards apart to separate electrically conductive components from one another and to allow for air-flow to dissipate heat generated during operation of the motor power boards.

In some cases, the control signal connector 312 may form all or part of the removable connection between the motor power boards 302A, 302B, 302C, and 302D. For instance, the control signal connector 312 may include one or more pin and socket connection systems. The pin and socket system may both physically connect the motor power boards and communicatively couple components of each motor power boards with the control system 310. Other types of communicative coupling are possible as well.

The power bus 314 may also form part of the removable connection between the motor power boards 302A, 302B, 302C, and 302D. For instance, the power bus 314 may include conductive elements that connect the motor power boards into the stacked configuration. The conductive elements may include one or more metal bars or rods, among other examples. Motor power controller 300 may also include one or more additional connections between the motor power boards.

The removable connections between the motor power boards may have varying degrees of removability. Some implementations may connect the motor boards using relatively quick release connectors, such as screw-type connectors. Other implementations may relatively more permanent connections, such as soldered connections. Certain motor control applications may suggest more or less permanent connections, depending on how frequently that the required power output of the motor control changes in the application.

Figure 3B:
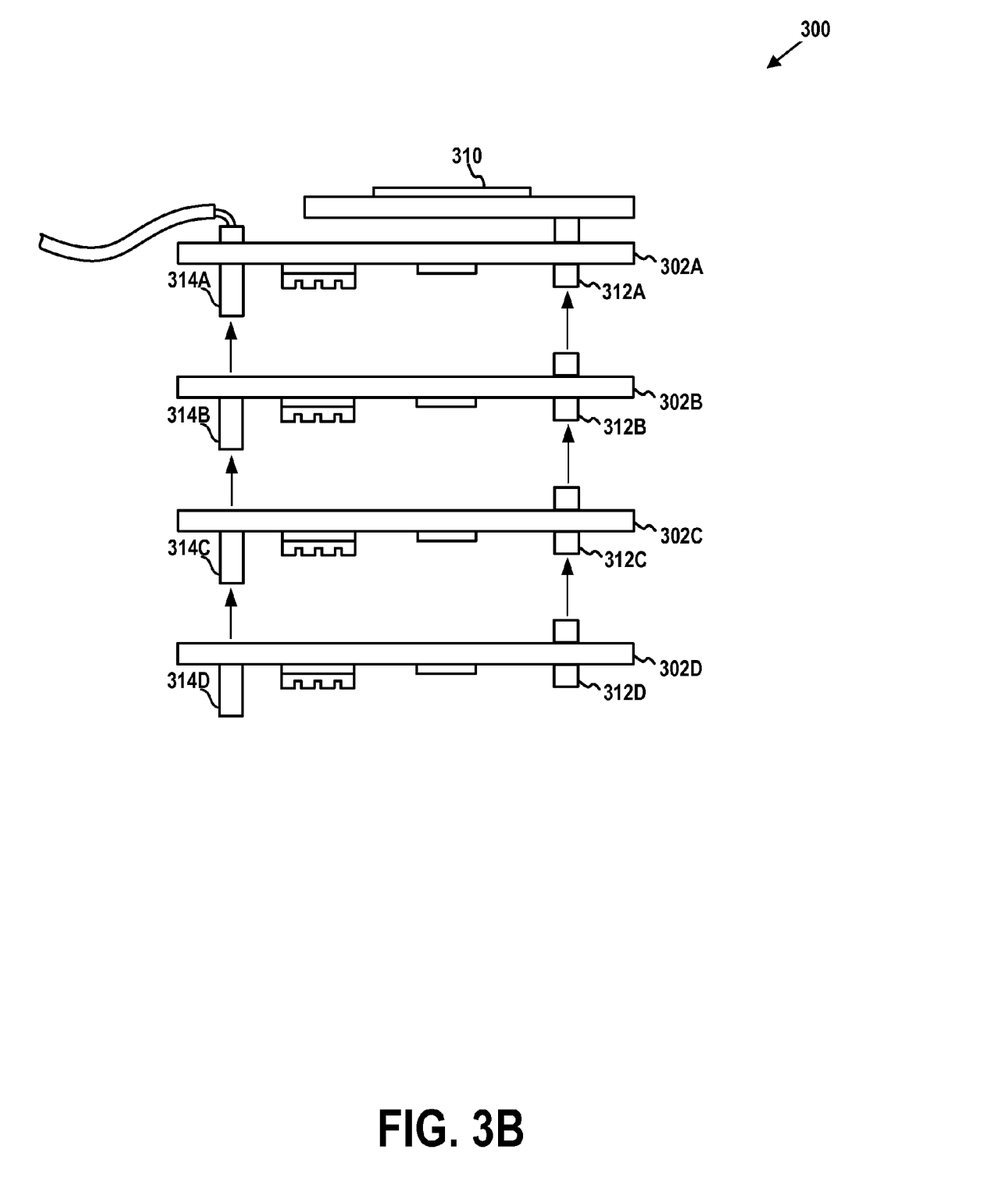
FIG. 3B is a side-view of the example motor controller in an alternate stacked configuration.

FIG. 3B illustrates motor power controller 300 in an alternate stacked configuration that includes motor power board 302A and control system 310. Connector 312A of motor power board 302A is connected to control system 310. To increase the power handling capability of motor controller 300, one or more of motor power boards 302B, 302C, and/or 302D may be stacked onto motor power controller 302A to form the stacked configuration of motor power boards.

In some implementations, the control signal connector may be divided into a respective connector on each motor power board. Such an implementation may facilitate coupling terminals of the motor power boards to one another in the stacked configuration. FIG. 3B shows control signal connector 312 as including connectors 312A, 312B, 312C, and 312D on motor power board 302A, 302B, 302C, and 302D, respectively. In such an implementation, stacking additional motor power board (e.g. motor power board 302B) to motor power board 302A may form a connection between the respective connector on each additional motor power board and the motor power board(s) in the stacked configuration. Further, with such an implementation, the control signal connector may be proportional in size to the stacked configuration of the multiple motor power boards.

The power bus 314 may also be divided into different connectors. FIG. 3B shows power bus 314 as comprising connectors 314A, 314B, 314C, and 314D on motor power board 302A, 302B, 302C, and 302D, respectively. In such a configuration, forming the stacked configuration may involve making connections between one or more of connectors 314A, 314B, 314C, and 314D.

Figure 4:
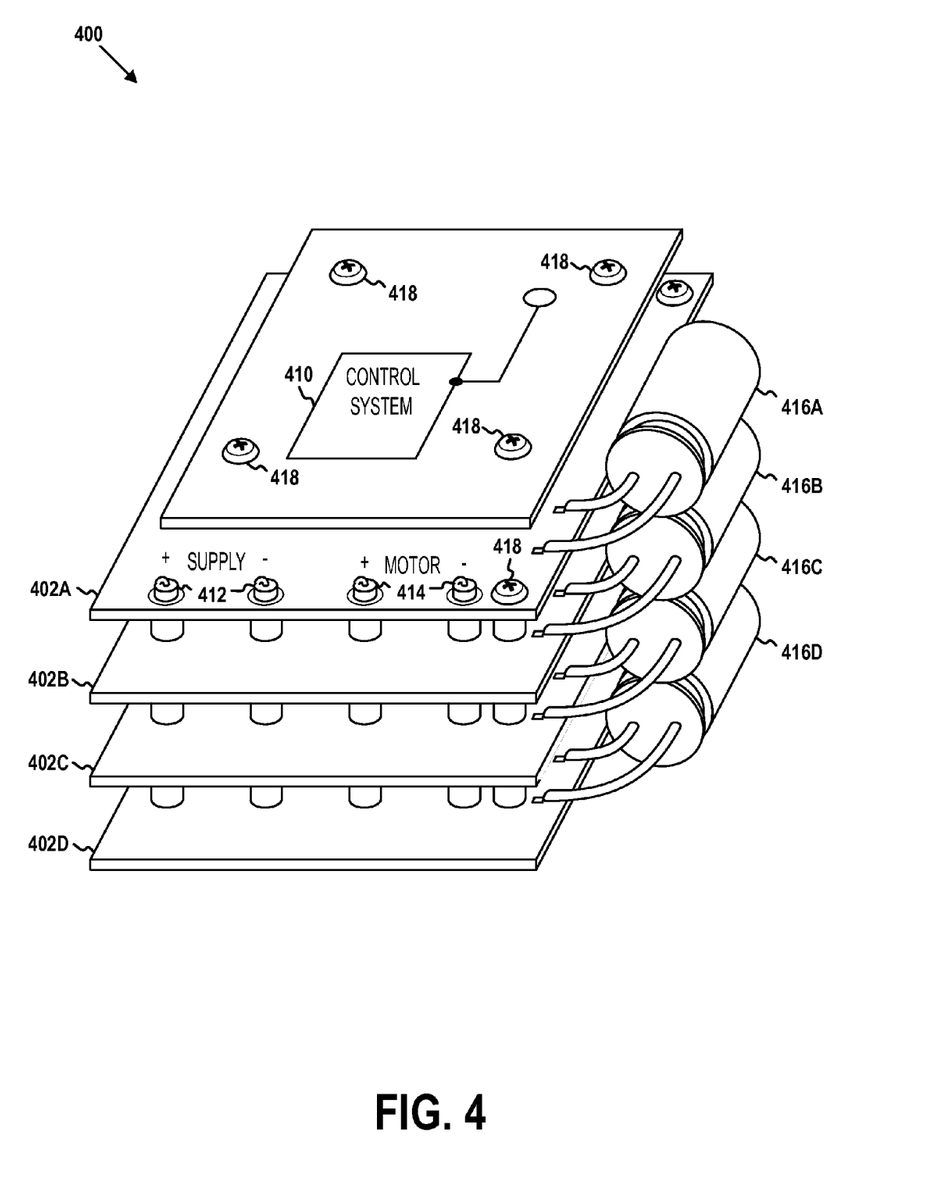
FIG. 4 is a perspective view of an example motor controller in a stacked configuration.

FIG. 4 is a perspective view of an example motor controller 400 in a stacked configuration. Motor controller 400 includes motor power boards 402A, 402B, 402C, and 402D, which may include, for example, components similar to motor power boards 102A, 102B, 102C, and 102D. The motor power boards 402A, 402B, 402C, and 402D may include one or more respective components, such as power transistors 404A, 404B, 404C, and 404D, gate drivers 404A, 404B, 404C, and 404D, or sensors 408A, 408B, 408C, and 408D (not shown). Motor controller 400 may also include a control system 410, as shown.

Motor power boards 402A, 402B, 402C, and 402D may further include capacitors 416A, 416B, 416C, and 416D. The motor power boards may include capacitors for a variety of functions. For instance, the capacitors may be connected between the supply terminals in an attempt to smooth the power supply current to the motor power board. As noted above, motor power boards may be produced to a specification. One example specification may suggest including capacitors 416A, 416B, 416C, and 416D at a particular location on each motor power board. Then, as shown in FIG. 4A, the stacked configuration may have substantially consistent length and width.

Motor controller 400 also includes a power bus connector 412. Power bus connector 412 couples power supply terminals of each motor power board in parallel. The power bus connector 412 includes two conductive bars extending through respective holes in each of the motor power boards, as shown. Alternatively, the power bus connector 412 may include any suitable connectors, such as pin and socket connectors. While the power supply terminals are shown near the edges of the motor power boards by way of example, the power supply terminals may be located in any suitable location on the motor power board. In operation, a power supply may supply current to power supply terminals on the motor controller 400. Since the power supply terminals of each motor power board are connected in parallel, each motor power board may receive the supplied current. Further, each motor power board may switch a portion of the supplied current to motor output terminals. As noted above, in some implementations, the control system 410 may selectively enable a subset of the multiple motor power boards. In such an implementation, the subset of motor power boards may switch the supplied current to motor output terminals.

Motor controller 400 also includes a motor output connector 414. Motor output connector 414 couples motor output terminals of each motor power board in parallel. The motor output connector 414 includes two conductive bars extending through holes in each motor power board, as shown. In other implementations, the motor output connector may include any suitable connectors, such as pin and socket connectors. While the motor output terminals are shown near the edges of the motor power boards by way of example, the power supply terminals may be located in any suitable location on the motor power board. In operation, since the motor output terminals of each motor power board are connected in parallel, a motor connected to the motor output terminals may receive the current switched by each of the motor power boards.

Additionally, motor controller 400 includes connectors 418. Connectors 418 connect the control system 410 and the motor power boards 402A, 402B, 402C, and 402D together in the stacked configuration. In some examples, connectors 418 may include one more nuts and one or more bolts. Alternatively, connectors 418 may include any suitable connector configured to removably couple the control system 410 and the motor power boards 402A, 402B, 402C, and 402D together in the stacked configuration.

Figure 5:
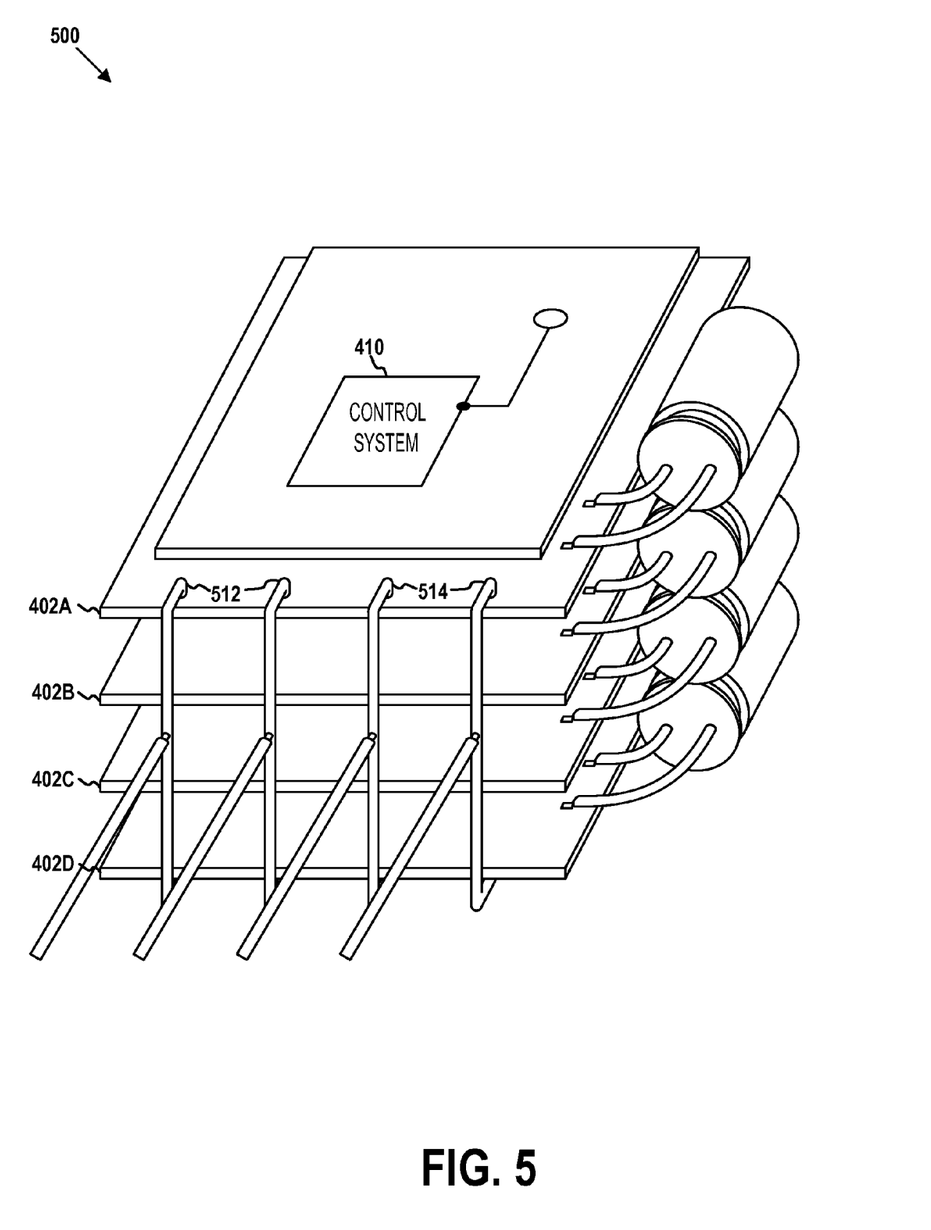
FIG. 5 is a perspective view of another example motor controller in a stacked configuration.

FIG. 5 is a perspective view of another motor controller 500 in a stacked configuration. Motor controller 500 includes motor power boards 402A, 402B, 402C, and 402D shown in FIG. 4.

Motor controller 500 illustrates an alternate implementation of the power bus connector and the motor output connector. Motor controller 500 includes power bus connector 512. Power bus connector 512 is provided along the stacked configuration of motor controller 500. Further power bus connector 512 is perpendicular to motor power boards 402A, 402B, 402C, and 402D. Motor controller 500 includes motor output connector 514. Motor output connector 514 is provided along the stacked configuration of motor controller 500. Further power bus connector 512 is perpendicular to motor power boards 402A, 402B, 402C, and 402D.

Figure 6:
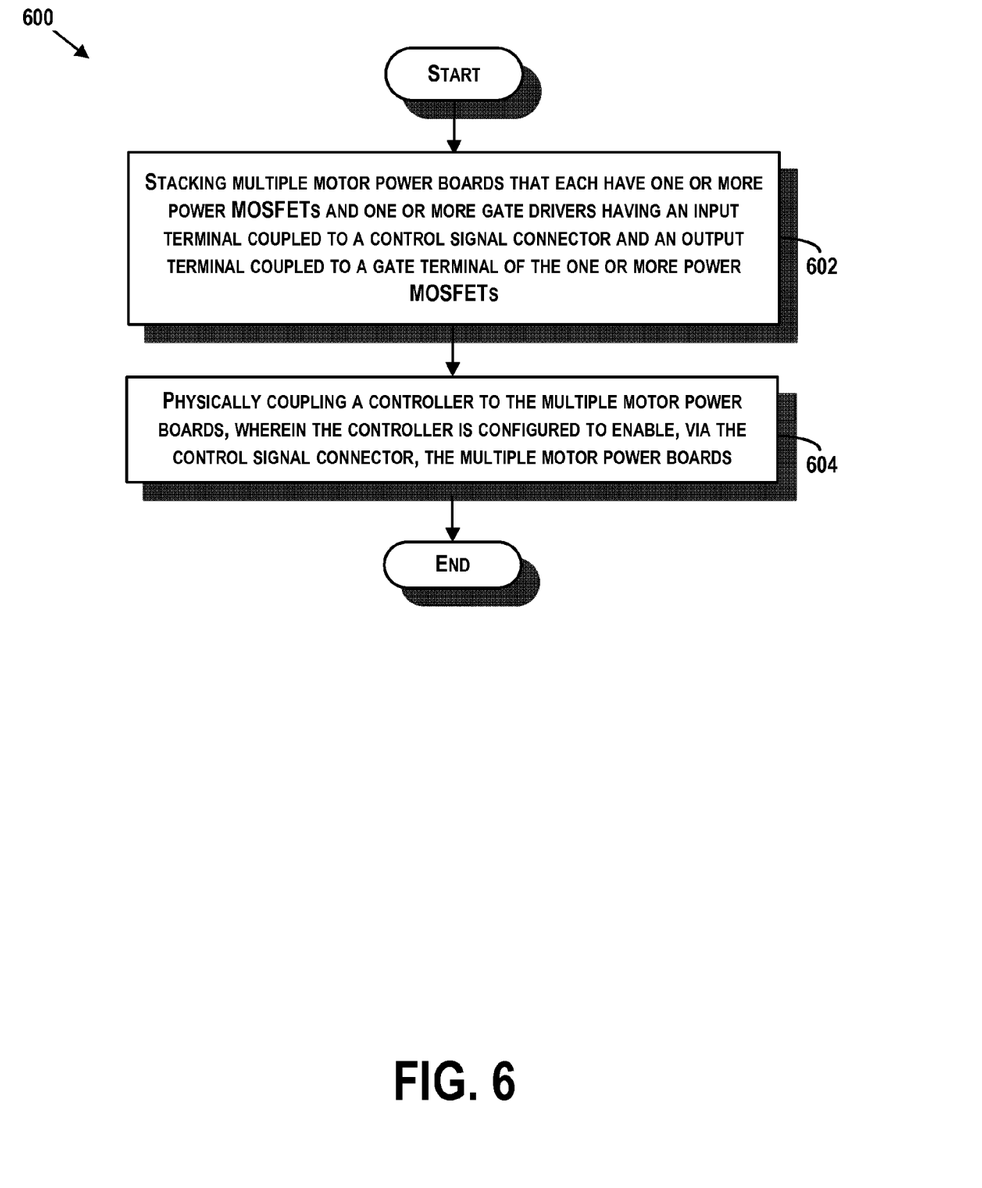
FIG. 6 is a flowchart illustrating an example method for building an arbitrary motor controller.

FIG. 6 is a block diagram of an example method 600 for building arbitrary motor controllers, in accordance with at least some implementations described herein. Method 600 shown in FIG. 6 presents an implementation of a method that, for example, could be performed by one or more machines as aspects of a manufacturing process. Alternatively, method 600 may instruct a person (such as an employee) in building a motor controller. Method 600 may include one or more operations, functions, or actions as illustrated by one or more blocks of 602-604. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 600 and other processes and methods disclosed herein, the flowchart shows functionality and operation of one possible implementation of present implementations. In this regard, each block may represent a step in a manufacturing process or a step performed by a person in building an arbitrary motor controller. In addition, for the method 600 and other processes and methods disclosed herein, each block in FIG. 6 may represent circuitry that is wired to perform the specific logical functions in the process.

At block 602, the method involves stacking multiple motor power boards that each have one or more power MOSFETs and one or more gate drivers having an input terminal coupled to a control signal connector and an output terminal coupled to a gate terminal of the one or more power MOSFETs. The motor power boards may be implemented as any of motor power boards 102A, 102B, 102C, or 102D as described in connection with FIG. 1, any of motor power boards 202A, 202B, 202C, or 202D as described in connection with FIG. 2, any of motor power boards 302A, 302B, 302C, or 302D as described in connection with FIGS. 3A and 3B, or any of motor power boards 402A, 402B, 402C, or 404D, as described in connection with FIGS. 4 and 5.

Stacking multiple motor power boards may involve coupling, in parallel, a power bus connector to a respective output terminal of each of the multiple motor power boards. In some examples, the power bus connector may be a power bus bar provided along the stacked configuration. For instance, power bus connector 514 of FIG. 5 is provided along the stacked configuration of motor power boards 402A, 402B, 402C, and 402D. A manufacturing process may provide the power bus bar perpendicular to the motor power boards. As shown in FIG. 5, power bus connector 514 is perpendicular to motor power boards 402A, 402B, 402C, and 402D. In some examples, for each of the multiple motor power boards, the manufacturing process may insert the power bus bar through a respective opening in each of the multiple motor power boards. After insertion, the power bus bar may resemble power bus bar 412 of FIG. 4. Stacking multiple motor power boards may further involve coupling a ground terminal connector to a respective ground terminal of each of the multiple motor power boards.

Within examples, the method may further involve selecting a set that includes a particular number of motor power boards, the particular number of motor power boards being based on an output power requirement. In some cases, the output power requirement may be predetermined. Alternatively, the output power requirement may be determined by a control system, such as control system 110. The determination of the output power requirement may be based at least in part on sensor data, such as data generated by a power sensor.

At block 604, the method also involves physically coupling a controller to the multiple motor power boards, wherein the controller is configured to enable, over the control signal connector, the multiple motor power boards. The controller may further be configured to perform any of the functions described above in connection with control system 110.

In some cases, the control signal connector may include a control signal bar provided perpendicularly to the multiple motor power boards and extending through respective openings in each of the multiple motor power boards.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An apparatus comprising:
   multiple motor power boards connected in a stacked configuration and coupled in parallel, wherein each motor power board comprises one or more power transistors and one or more gate drivers having an input terminal coupled to a control signal connector and an output terminal coupled to a gate terminal of the one or more power transistors;
   a power bus connector coupled, in parallel, to a respective output terminal of each of the multiple motor power boards; and
   a sensor; and
   a control system coupled to the control signal connector and configured to:
   receive, from the sensor, data indicating power draw from the output terminals of the multiple motor power boards;
   determine an output power requirement based on the received data; and
   selectively enable a set that includes one or more of the multiple motor power boards based on the output power requirement.

2. The apparatus of claim 1, wherein the control signal connector connects a given gate driver of each motor power board in parallel.

3. The apparatus of claim 1, wherein the control system selectively enables the set of the multiple motor power boards by:
   providing a drive signal, over the control signal connector, to the set of the multiple motor power boards.

4. The apparatus of claim 1, wherein the power bus connector comprises a power bus bar provided along the stacked configuration and perpendicular to the multiple motor power boards.

5. The apparatus of claim 1, wherein the power bus connector comprises a power bus bar provided perpendicularly to the multiple motor power boards and extending through respective openings in each of the multiple motor power boards.

6. The apparatus of claim 1, wherein the control signal connector comprises a control signal bar provided perpendicularly to the multiple motor power boards and extending through respective openings in each of the multiple motor power boards.

7. The apparatus of claim 1, wherein the control signal connectors of the multiple motor power boards are each located in a respective position on the respective motor power board such that, in the stacked configuration, each control signal connector physically contacts one or more control signal connectors of one or more neighboring motor power boards.

8. The apparatus of claim 1, wherein the output terminals of the multiple motor power boards are each located in a respective position on the respective motor power board such that, in the stacked configuration, each output terminal physically contacts one or more output terminals of one or more neighboring motor power boards.

9. A method comprising:
   stacking multiple motor power boards that each have one or more power MOSFETs and one or more gate drivers having an input terminal coupled to a control signal connector and an output terminal coupled to a gate terminal of the one or more power MOSFETs; and
   physically coupling a control system to the multiple motor power boards, wherein the control system is configured to:
   receive, from a sensor, data indicating power draw from the output terminals of the multiple motor power boards;
   determine an output power requirement based on the received data; and
   selectively enable a set that includes one or more of the multiple motor power boards based on the output power requirement.

10. The method of claim 9, wherein stacking multiple motor power boards comprises:
    selecting a set that includes a particular number of motor power boards, the particular number of motor power boards being based on an output power requirement.

11. The method of claim 9, wherein stacking multiple motor power boards further comprises:
    coupling, in parallel, a power bus connector to a respective output terminal of each of the multiple motor power boards.

12. The method of claim 11, wherein the power bus connector is a power bus bar provided along the stacked configuration and perpendicular to the multiple motor power boards.

13. The method of claim 11, wherein the power bus connector is a power bus bar, and wherein coupling, in parallel, a power bus connector to a respective output terminal of each of the multiple motor power boards comprises:
    for each of the multiple motor power boards, inserting the power bus bar through a respective opening in each of the multiple motor power boards.

14. The method of claim 9, wherein stacking multiple motor power boards further comprises:
    coupling a ground terminal connector to a respective ground terminal of each of the multiple motor power boards.

15. The method of claim 9, wherein the control signal connector comprises a control signal bar provided perpendicularly to the multiple motor power boards and extending through respective openings in each of the multiple motor power boards.

16. An apparatus comprising:
    multiple motor power boards connected in a stacked configuration, wherein each motor power board comprises one or more power MOSFETs and one or more gate drivers having an input terminal coupled, in parallel, to a control signal connector and an output terminal coupled, in parallel, to a gate terminal of the one or more power MOSFETs; and a control system coupled to the control signal connector and configured to:
 receive, from a sensor, data indicating power draw from the output terminals of the multiple motor power boards;
 determine an output power requirement based on the received data; and
 selectively provide, over the control signal connector, a drive signal to a set of the multiple motor power boards based on the output power requirement.

17. The apparatus of claim 16, wherein each motor power board further comprises a power sensor arranged to detect power draw from the output terminal of the respective motor power board, and wherein receiving, from the sensor, data indicating power draw from the output terminals of the multiple motor power boards comprises receiving data indicating power draw from one or more of the power sensors.

18. The apparatus of claim 16, wherein each motor power board further comprises a temperature sensor, and wherein the control system is further configured to:
 receive data indicating one or more temperatures from one or more of the temperature sensors;
 determine that one or more of the received temperatures is over a predetermined threshold temperature; and
 provide, over the control signal connector, the drive signal to one or more additional motor power boards.

19. The apparatus of claim 16, further comprising:
 a power bus connector coupled to a respective output terminal of each of the multiple motor power boards.

20. The apparatus of claim 16, wherein each gate terminal has a respective gate driver.

* * * * *